(12) United States Patent
Sabelström et al.

(10) Patent No.: US 7,033,549 B1
(45) Date of Patent: *Apr. 25, 2006

(54) AIR COMPRESSION ARRANGEMENT FOR VEHICLES

(75) Inventors: Mats Sabelström, Billdal (SE); Lucas Megas, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/958,980

(22) PCT Filed: Apr. 4, 2000

(86) PCT No.: PCT/SE00/00638

§ 371 (c)(1),
(2), (4) Date: Jan. 24, 2002

(87) PCT Pub. No.: WO00/66251

PCT Pub. Date: Nov. 9, 2000

(30) Foreign Application Priority Data

Apr. 16, 1999 (SE) ..................................... 9901355

(51) Int. Cl.
*B01D 53/68* (2006.01)
*F15B 21/04* (2006.01)

(52) U.S. Cl. ...................... 422/177; 422/171; 422/173; 422/199; 60/280; 60/274; 60/299

(58) Field of Classification Search ................ 422/177, 422/171, 173; 60/280, 274, 299
See application file for complete search history.

(56) References Cited

U.S. PATENT DOCUMENTS

| 4,754,607 A | * | 7/1988 | Mackay ........................ 60/723 |
| 4,794,753 A | * | 1/1989 | Beebe .......................... 60/796 |
| 5,182,086 A | * | 1/1993 | Henderson et al. .......... 422/171 |
| 5,409,514 A |   | 4/1995 | Ragusa et al. |
| 5,460,784 A | * | 10/1995 | Gillbrand et al. ........... 422/168 |
| 5,906,480 A |   | 5/1999 | Sabelström et al. |
| 2004/0103644 A1 | * | 6/2004 | Sabelstrom et al. .......... 60/280 |

FOREIGN PATENT DOCUMENTS

DE A1 195 15 895 10/1996
EP 001045117 A1 * 10/2000

* cited by examiner

*Primary Examiner*—N. Bhat
(74) *Attorney, Agent, or Firm*—Birch, Stewart, Kolasch & Birch, LLP

(57) ABSTRACT

The invention relates to an arrangement for a compressed-air system (1) in a vehicle, comprising a connection (6, 10) for feeding compressed air from a compressor (2) to the rest of the compressed-air system. The invention is characterized in that it comprises an oxidation catalyst (9) which is adapted for cleaning the compressed air and which is positioned along said connection (6, 10), said connection (6, 10) comprising a line (10) which is connected between the oxidation catalyst (9) and the rest of the compressed-air system. The invention provides an improved arrangement for cleaning compressed air in a compressed-air system for a vehicle.

13 Claims, 1 Drawing Sheet

AIR COMPRESSION ARRANGEMENT FOR VEHICLES

This application is the national phase under 35 U.S.C. § 371 of PCT International Application No. PCT/SE00/00638 which has an International filing date of Apr. 4, 2000, which designated the United States of America and was published in English.

TECHNICAL FIELD

The present invention relates to an arrangement for a compressed-air system in a vehicle. The invention is intended in particular for use in compressed-air systems in heavy-duty lorries.

BACKGROUND ART

In connection with a vehicle which is provided with a compressed-air system for producing, storing and distributing compressed air to, for example, the air suspension system and the brake system, which in a manner known per se includes pressure tanks, compressed-air lines and various types of valve, said system is supplied with compressed air from a compressed-air compressor. Said compressor is driven in a manner known per se by means of the internal combustion engine of the vehicle. To lubricate the compressor, use is made, according to the known art, of lubricating oil from the lubricating oil system of the internal combustion engine.

In accordance with previously known art, the compressed air can be fed from the compressor to the compressed-air system of the vehicle. A problem which occurs in previously known compressed-air systems of the abovementioned type is that the compressed air which is generated in the compressor is often contaminated by lubricating oil in aerosol and gaseous form. During operation of the compressor, a very high temperature is reached, which can lead to oxidation of the lubricating oil mixed into the compressed air, which can result in polymerization of the oil and the formation of aggressive oxidation products. If these contaminants were to be conveyed to the rest of the compressed-air system of the vehicle, coatings could be formed in the components of said system. These coatings can cause clogging and corrosion of the material of said components, which can in turn cause failure of the components.

According to the known art, the compressed air generated in the compressed-air compressor can be cleaned by means of a mechanical filter combined with cooling. A disadvantage of this technique, however, is its low degree of efficiency.

DISCLOSURE OF INVENTION

The object of the present invention is to provide an arrangement for efficient cleaning of compressed air in a compressed-air system for a vehicle, in particular for a compressed-air system in which the compressed air is generated by a compressor which is lubricated by lubricating oil from an internal combustion engine.

The invention constitutes an arrangement for a compressed-air system in a vehicle and comprises a connection for feeding compressed air from a compressor to the rest of the compressed-air system. The invention is characterized in that it comprises an oxidation catalyst which is adapted for cleaning the compressed air and which is positioned along said connection, said connection comprising a line which is connected between the oxidation catalyst and the rest of the compressed-air system.

Advantageous embodiments of the invention emerge from the dependent patent claims below.

BRIEF DESCRIPTION OF DRAWINGS

The invention will be explained in greater detail below with reference to a preferred illustrative embodiment and the appended FIG. 1 which is a basic diagram of an arrangement according to the present invention.

MODE FOR CARRYING OUT THE INVENTION

Figure 1:
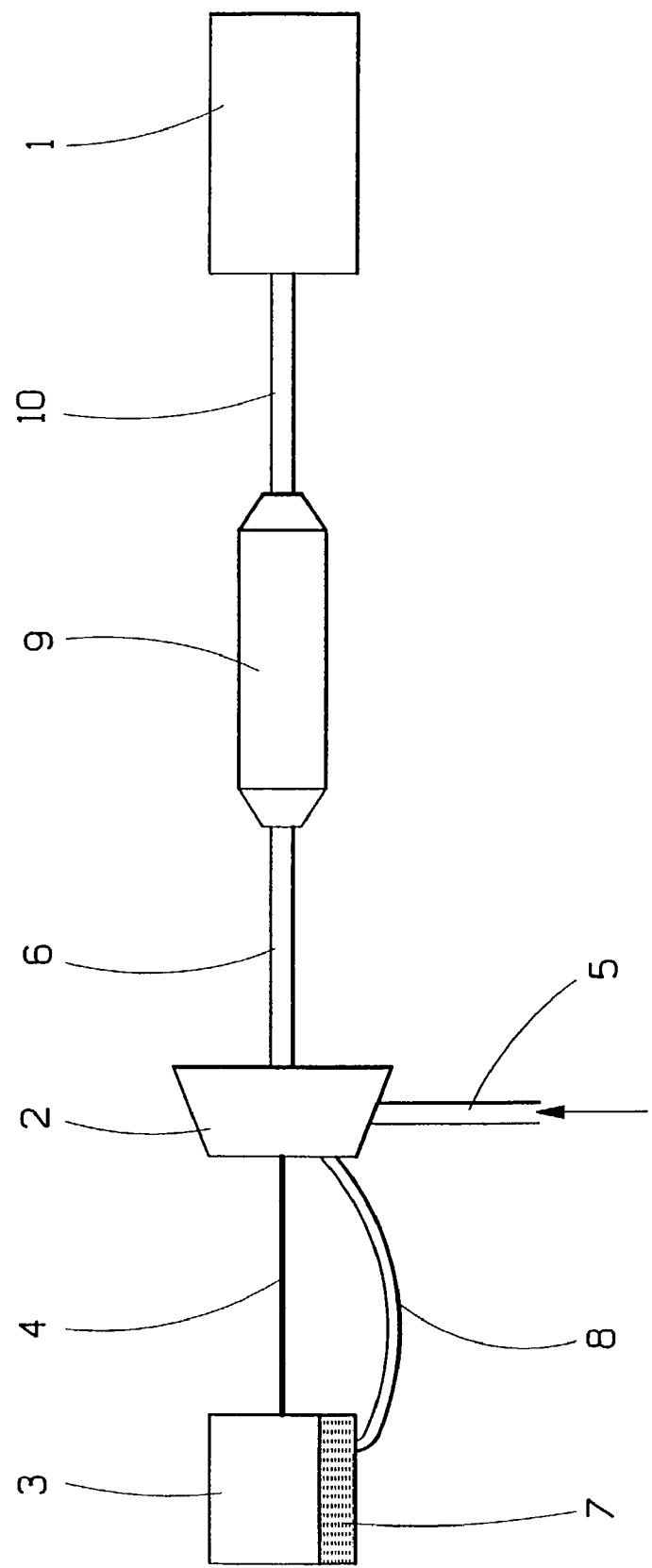

FIG. 1 is a basic diagram of an arrangement according to the present invention. According to a preferred embodiment, the arrangement is used in connection with a compressed-air system 1 of a type known per se, which may preferably but does not have to consist of a compressed-air system for a lorry. The compressed-air system 1, which comprises, for example, a pressure tank and also the air-suspension system and the brake system of the vehicle, is reproduced in a greatly simplified manner in FIG. 1.

Compressed air in the compressed-air system 1 is generated in a compressor 2 which is mechanically connected to an internal combustion engine 3 via a transmission 4. In this way, the air flowing from the atmosphere, as indicated by an arrow in the figure, and to the compressor 2 via an air intake line 5, can be compressed and fed out in a line 6. The compressor 2 is supplied with lubricating oil from the lubricating oil system 7 of the internal combustion engine 3 via a separate line 8 which is connected to the compressor 2.

When the compressor is in operation, a very high temperature is generated in it, which causes oxidation of the lubricating oil mixed into the compressed air. The aggressive oxidation products then formed, for example esters, resin-like substances and aerosols, can contaminate the compressed air generated in the compressor 2. If this contaminated compressed air were to be fed to the compressed-air system 1, it could form coatings on pressure tanks and the like and bring about clogging of valves and material corrosion. For this reason, it is a fundamental principle of the present invention that the contaminated compressed air is led from the compressor 2 to an oxidation catalyst 9 via the line 6 connected to it from the compressor 2. In the oxidation catalyst 9, the contaminants contained in the compressed air will be converted to carbon dioxide and water. The cleaned compressed air is then conveyed to the compressed-air system 1 by means of another line 10.

The oxidation catalyst 9 is designed in such a manner that it has a given minimum limit temperature at which it is capable of working with satisfactory cleaning capacity. This limit temperature is usually of the order of roughly 200° C. In order to guarantee the desired limit temperature, the invention can be adapted so that the oxidation catalyst 9 comprises heating means. This can in turn be brought about by the oxidation catalyst 9 being designed with an electric heating arrangement, in which way it is possible to ensure that the desired temperature of the oxidation catalyst 9 can be reached.

It may be pointed out, however, that the correct working temperature is reached in the oxidation catalyst 9 during normal operation of the compressor 2 without a separate heating arrangement, because the compressed air generated in the compressor 2 reaches a very high temperature.

The invention is not limited to the embodiment described above but can be varied within the scope of the patent claims below. For example, the invention can be used in different types of vehicle, for example private cars, lorries, loading machines and buses, which comprise a compressor for generating compressed air for a compressed-air system.

The invention claimed is:

1. An apparatus for a compressed-air system (1) in a vehicle, comprising: a connection (6,10) for feeding compressed air from a compressor (2) to the rest of the compressed-air system, wherein it comprises an oxidation catalyst (9) which is adapted for cleaning the compressed air and which is positioned along said connection (6,10), said connection (6,10) comprising a line (10) which is connected between the oxidation catalyst (9) and the rest of the compressed-air system.

2. An apparatus according to claim 1, wherein the oxidation catalyst (9) can be heated.

3. An apparatus according to claim 2, wherein the oxidation catalyst (9) can be heated by means of an electric heating arrangement.

4. An apparatus according to claim 1 wherein the apparatus includes an engine (3) consisting of a diesel engine.

5. An apparatus according to claim 2 wherein the apparatus inclues an engine (3) consisting of a diesel engine.

6. An apparatus according to claim 3 wherein the apparatus includes an engine (3) consisting of a diesel engine.

7. An apparatus according to claim 1 wherein the compressed-air system is a brake system.

8. An apparatus according to claim 1 wherein the compressed-air system is an air suspension system.

9. A system for a vehicle having an engine for powering the vehicle, comprising:
- a compressor, that is driven by the engine, for drawing air and supplying compressed air to a vehicle mounted compressed-air system;
- a lubricating oil system for lubricating the vehicle engine and the compressor;
- a line for feeding compressed air from the compressor to the compressed-air system; and
- an oxidation catalyst device, coupled to the line, for cleaning the compressed air which is contaminated by the lubricating oil system and for feeding clean air to the remainder of the compressed-air system.

10. A system according to claim 9 wherein the compressed-air system is a brake system.

11. A system according to claim 9 wherein the compressed-air system is an air suspension system.

12. A system according to claim 9 wherein the air is drawn into the compressor from the atmosphere.

13. A system according to claim 9 wherein the vehicle engine is a diesel engine.

* * * * *